(12) United States Patent
Brooks

(10) Patent No.: US 11,913,423 B2
(45) Date of Patent: Feb. 27, 2024

(54) SYSTEM FOR HARNESSING KINETIC ENERGY OF OCEANS

(71) Applicant: Nathaniel Brooks, Juneau, AK (US)

(72) Inventor: Nathaniel Brooks, Juneau, AK (US)

( * ) Notice: Subject to any disclaimer, the term of this patent is extended or adjusted under 35 U.S.C. 154(b) by 0 days.

(21) Appl. No.: 17/949,195

(22) Filed: Sep. 20, 2022

(65) Prior Publication Data

US 2023/0417214 A1 Dec. 28, 2023

Related U.S. Application Data

(60) Provisional application No. 63/355,205, filed on Jun. 24, 2022.

(51) Int. Cl.
*F03B 13/18* (2006.01)

(52) U.S. Cl.
CPC .. *F03B 13/1845* (2013.01); *F05B 2220/7068* (2013.01); *F05B 2240/93* (2013.01)

(58) Field of Classification Search
CPC ........ F03B 13/26; F03B 13/16; F03B 13/188; F03B 13/1885; F03B 13/20; F03B 15/00; F05B 2240/93; F05B 2260/4031; F05B 2220/706; F05B 2240/97; F05B 2280/5001
See application file for complete search history.

(56) References Cited

U.S. PATENT DOCUMENTS

| | | | | |
|---|---|---|---|---|
| 4,232,230 A | * | 11/1980 | Ames | F03B 13/1895 290/53 |
| 9,764,804 B1 | * | 9/2017 | Kennamer, Sr. | F03B 13/20 |
| 2007/0132246 A1 | * | 6/2007 | Hirsch | F03B 13/1845 290/42 |
| 2011/0198850 A1 | * | 8/2011 | Stromstedt | F16J 15/3224 290/53 |
| 2014/0077496 A1 | * | 3/2014 | Gill Londono | F03B 13/142 290/53 |
| 2014/0313001 A1 | * | 10/2014 | Phillips | F03B 13/188 335/306 |
| 2020/0170284 A1 | * | 6/2020 | Sato | B63B 22/04 |

* cited by examiner

*Primary Examiner* — Shafiq Mian
(74) *Attorney, Agent, or Firm* — Barry Choobin; Patent 360

(57) ABSTRACT

A system and method for harnessing the kinetic energy of the ocean to generate electricity. The system includes a dock made from a buoyant material. The dock has floats at its corners that can receive fixed pillars, such that the floats can move up and down relative to the pillars. Either of the float and the respective pillar has one or more permanent magnets while the other has the conductive coil. The movement of the dock and thus the floats relative to the fixed upstanding pillars results in the generation of electricity.

16 Claims, 4 Drawing Sheets

SYSTEM FOR HARNESSING KINETIC ENERGY OF OCEANS

CROSS-REFERENCE TO RELATED APPLICATIONS

This application claims priority from a U.S. Provisional Patent Appl. No. 63/355,205 filed on Jun. 24, 2022, which is incorporated herein by reference in its entirety.

FIELD OF INVENTION

The present invention relates to a renewable energy system, and more particularly, the present invention relates to a system for harnessing kinetic energy of oceans.

BACKGROUND

The increasing cost of fossil fuels, declining reserves, and global warming are the main factors pushing the demand for renewable energy. At present, solar energy has the major share in the renewable energy sector, however, harnessing solar energy has certain limitations. So, different modes of harnessing renewable energy must be investigated to the fullest extent. Tidal energy is one of the least explored sources of renewable energy. Harnessing tidal energy can be particularly useful for people living near seashores. Tidal energy can provide clean and economical electricity to such people as well as a source of income by selling renewable energy.

Thus, a need is always there for novel devices to harness kinetic energy of oceans.

The phrase kinetic energy of oceans includes wave energy, tidal energy, and the like kinetic energy in the oceans.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system to harness kinetic energy of oceans for generating renewable energy.

It is another object of the present invention that the system is easy to install and use.

It is still another object of the present invention that the system has high efficiency for energy generation.

It is a further object of the present invention that the running costs can be low.

It is yet another object of the present invention that the harbors and docks can be utilized and the need for land can be avoided.

In one aspect, disclosed is a system and method for harnessing kinetic energy of ocean to generate electricity, the system comprises a dock made from a buoyant material, the dock has a plurality of floats, each float of the plurality of floats has a central aperture, each float of the plurality of floats comprises one or more permanent magnets or a conductive coil; and a plurality of upstanding pillars, wherein each pillar of the plurality of pillars comprises one or more permanent magnets or a conductive coil, wherein each float of the plurality of floats receives a pillar of the plurality of upstanding pillars, wherein the dock is configured to move up and down relative to the plurality of upstanding pillars by the kinetic energy of the ocean, wherein either of the float and the respective pillar has the one or more permanent magnets while the other has the conductive coil, wherein the movement of the dock relative to the plurality of upstanding pillars results in generation of electricity. Each pillar of the plurality of upstanding pillars has the one or more permanent magnets and each float of the plurality of floats has the conductive coil. Each pillar of the plurality of upstanding pillars has the conductive coil and each float of the plurality of floats has the one or more permanent magnets. The kinetic energy of the ocean is the energy of waves. The plurality of floats comprises four floats and the plurality of upstanding pillars comprises four pillars, the four floats are configured at four corners of the dock. The one or more permanent magnets are radially arranged in rows on an outer surface of each pillar and the conductive coil wound within each float around the respective central aperture. The one or more permanent magnets are radially arranged within each float around the respective central aperture and the conductive coil wound around each pillar up to a pre-determined length. Each pillar of the plurality of upstanding pillars is cylindrical and the central aperture of each float is round, a diameter of the central aperture of each float is larger than a diameter of each pillar so that the float freely moves relative to the respective pillar.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
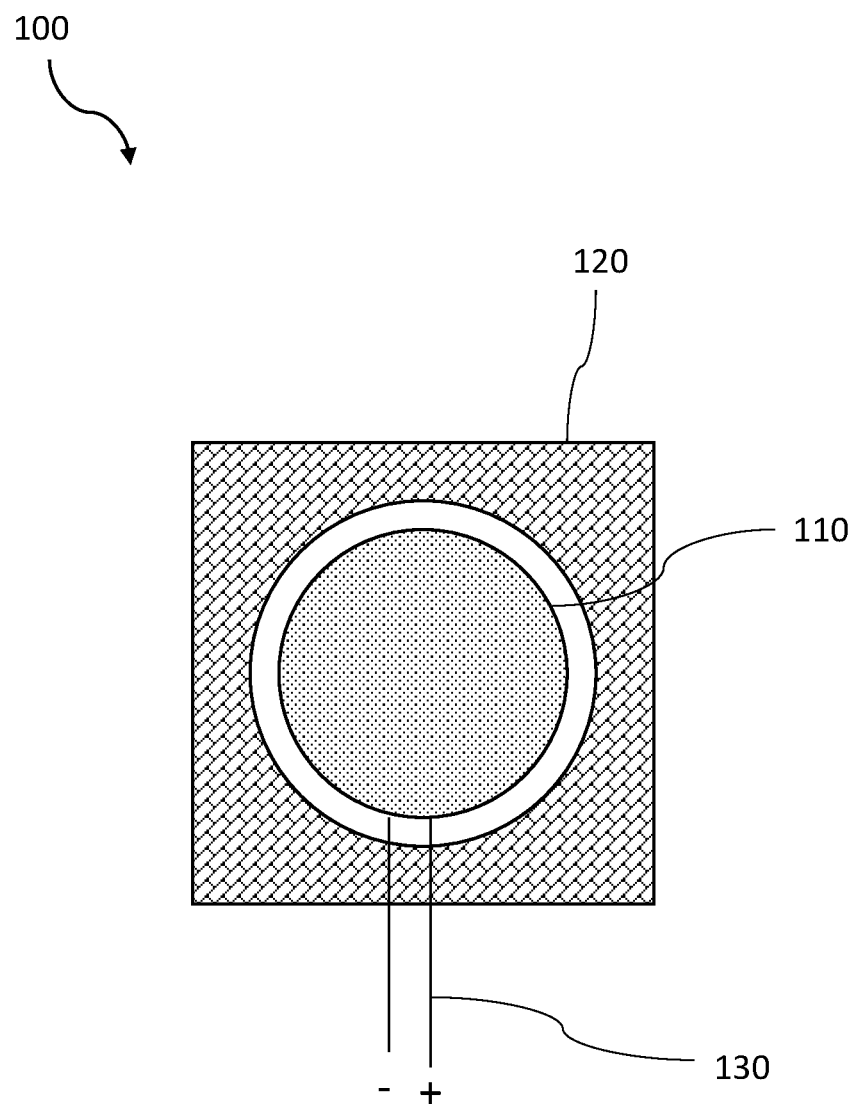
FIG. 1 is a top view of the pillar and a float of the system, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed are a system and method for harnessing kinetic energy of oceans to generate renewable electricity. Renewable energy can be collected using electrical wires and can be stored and/or directly utilized. The disclosed system can be used on seashores that have a good frequency of waves and tides. Docks, harbors, and the like can be utilized for the disclosed system for harnessing the kinetic energy of oceans. This additional utility of docks and harbors can generate more income for people nearby such docks and harbors.

The disclosed system includes one or more upstanding fixed pillars. The pillar can be made from concrete, wood, metal, and the like materials. The pillar can be sturdy enough to bear the tides and external forces.

The system further includes one or more floats for one or more pillars. The float can be positioned around the pillar and circumferencing the pillar. There may be enough space between the pillar and the float so that the float can freely move up and down relative to the pillar. The float can have a hole at its center which receives the pillar. Suitable splines can be used to keep the distance between the float and the pillar and thus preventing the float from colliding with the pillar. The float can be moved by the waves and/or tides up and down relative to the fixed pillar. Either the pillar or the float can be provided with fixed magnets and then another can be provided with coils. The movement of the magnets or the coils relative to the fixed coils or magnets respectively results in the generation of inductance current in the coils. These inductance currents can be collected using electrical wires wherein the coils can be connected to the electrical wires.

Figure 2:
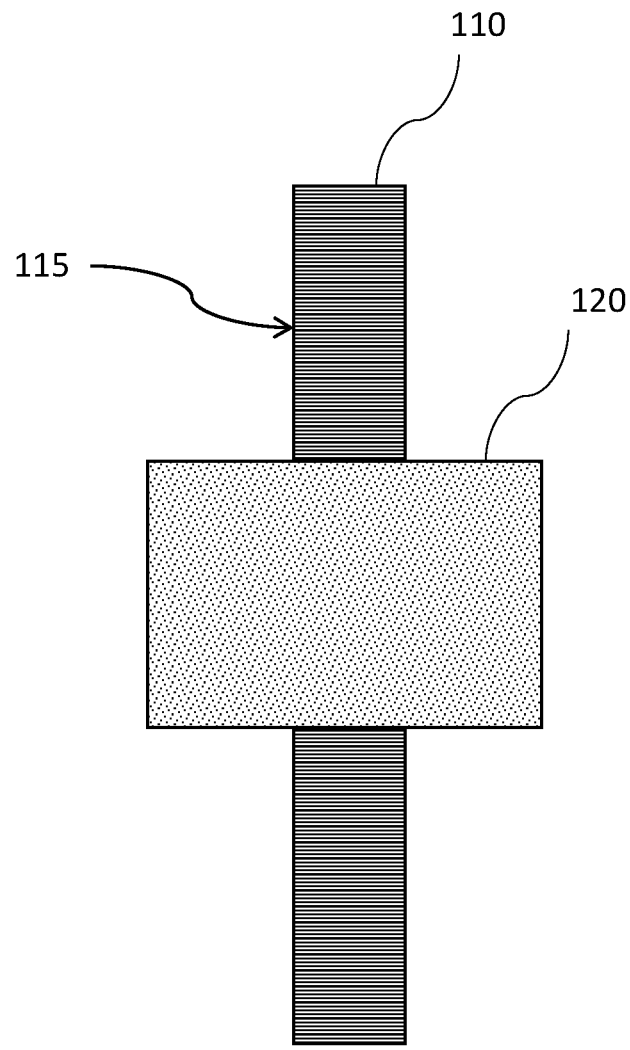
FIG. 2 is a side view of the pillar and float of the system, according to an exemplary embodiment of the present invention.

Referring to FIGS. 1 and 2 illustrate an exemplary embodiment of the disclosed system 100. A pillar 110 is at the center and a coil 115 can be wrapped around the pillar. A float 120 is positioned around the pillar and the float can move up and down relative to the fixed pillar. The float can be moved up and down by the waves and/or tides. Within the float are permanent magnets (not shown) radially mounted and within an inner cavity of the float and spatially positioned around the pillar. Electrical wired 130 are shown connected to the coil in FIG. 1.

In one implementation, the coils can be wound around the fixed pillar and the permanent magnets can be provided in the float. The float can be moved by the waves and/or tides up and down relative to the pillar. The movement of permanent magnets relative to the fixed coils generates inductance currents in the coil which can be drawn by the electrical wires connected to the coil.

In another implementation, the permanent magnets can be disposed radially around the fixed pillar and the coils can be provided within the float in a spiral arrangement. The float can be moved by the waves and/or tides up and down relative to the pillar. The movement of coils relative to the fixed permanent magnets generates inductance currents in the coils which can be drawn by the electrical wires connected to the coils.

Figure 3:
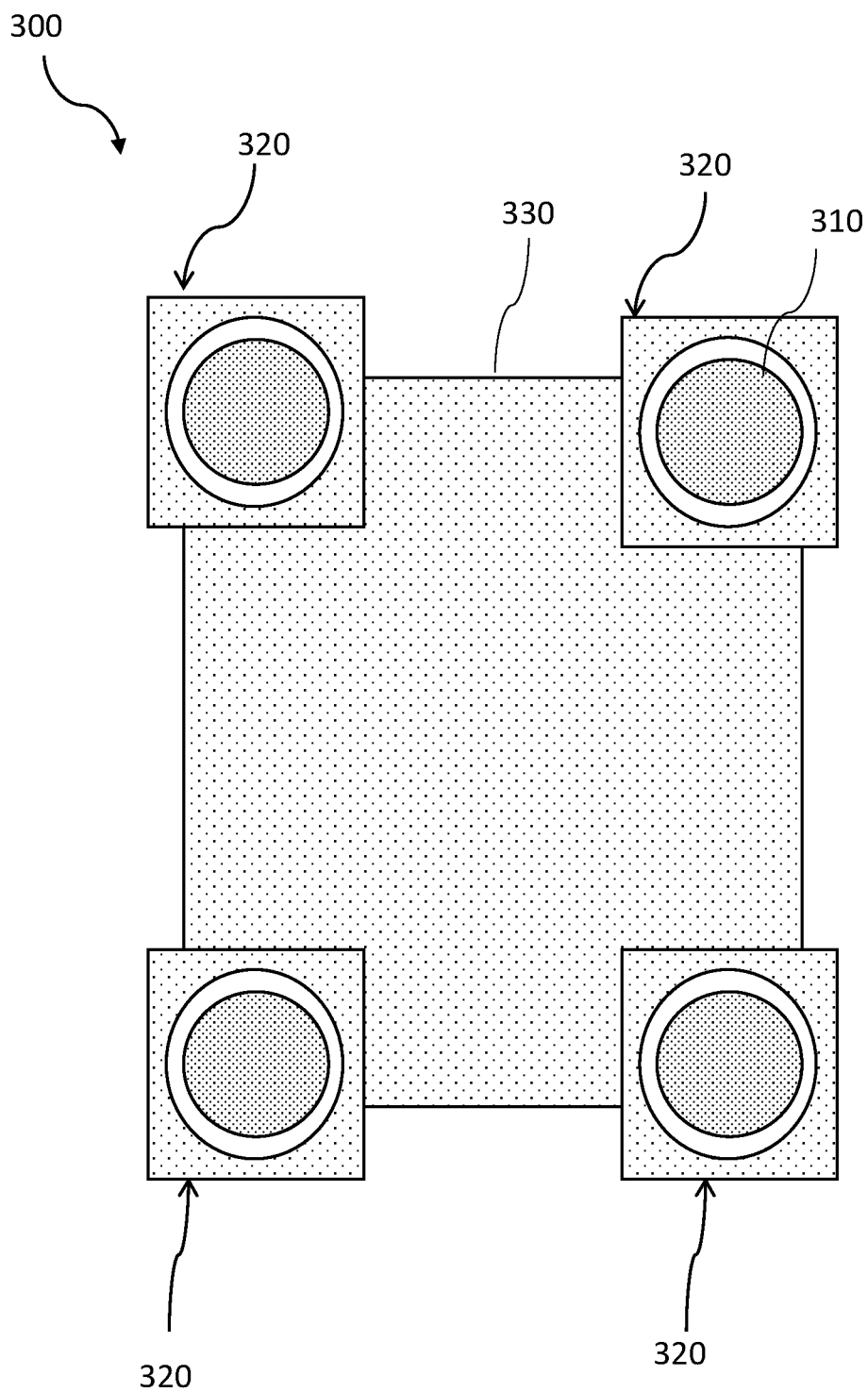
FIG. 3 is a top view of the system having four pillars and a deck with four floats, according to an exemplary embodiment of the present invention.

Referring to FIG. 3 which is a top view of system 300 having four pillars 310 and four floats 320, the four floats can be built as a single deck 330 that can be made from Buoyancy materials. The tides can move the whole deck up and down relative to the four fixed pillars. The number of floats and pillars can be varied without departing from the scope of the present invention.

Figure 4:
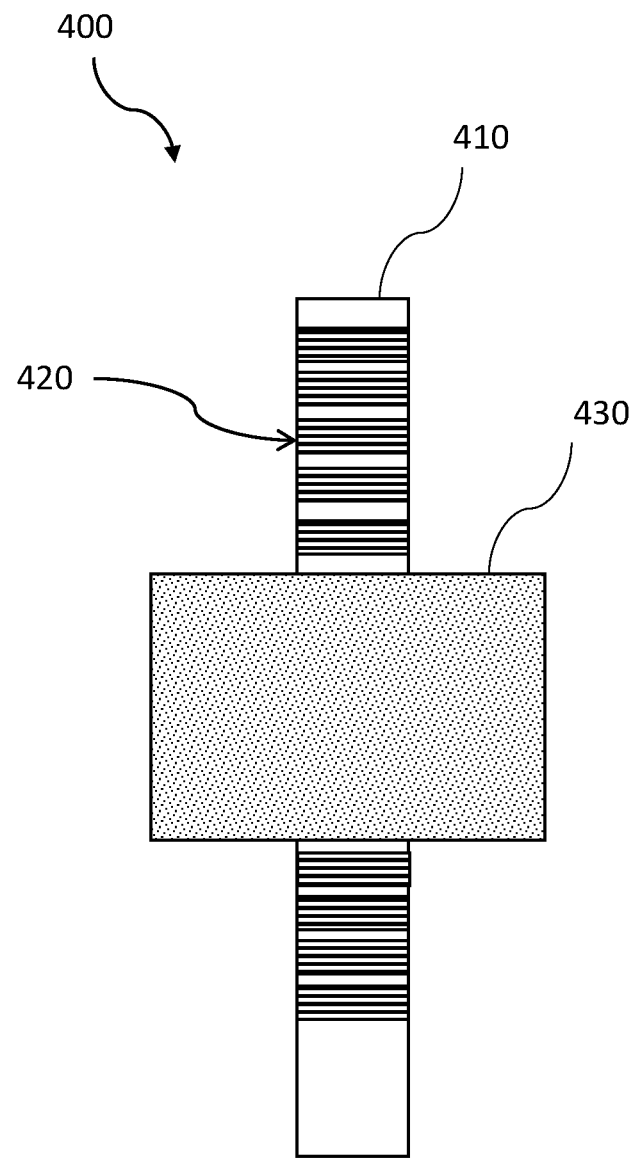
FIG. 4 shows another embodiment of the system having permanent magnets on the pillar, according to an exemplary embodiment of the present invention.

Referring to FIG. 4 which shows an alternate embodiment of the system. FIG. 4 shows a system 400 that has a pillar 410 at the center. The pillar has several spaced apart permanent magnets 420 radially encircling the pillar and spanning across a length of the pillar. A float 430 is positioned around the pillar and the float can move up and down relative to the fixed pillar. The float can be moved up and down by the waves and/or tides. Within the float are coils arranged within an inner cavity of the float and spatially positioned around the pillar. Electrical wired can be connected to the coils.

In one implementation, the dock is made from buoyant material and the dock has two or more floats. Each float has an aperture to receive the upstanding pillar. At least one float of the two or more floats has permanent magnets and at least one float of the two or more floats has the conductive coil. It is understood that the respective pillars have the conductive coils and the permanent magnets.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for harnessing kinetic energy of ocean to generate electricity, the system comprises:
   a dock made from a buoyant material, the dock has a plurality of floats, each float of the plurality of floats has a central aperture, each float of the plurality of floats comprises one or more permanent magnets or a conductive coil; and a plurality of upstanding pillars, wherein each pillar of the plurality of upstanding pillars comprises one or more permanent magnets or a conductive coil, wherein each of the float of the plurality of floats receives one of the upstanding pillars of the plurality of upstanding pillars, wherein the dock is configured to move up and down relative to the plurality of the upstanding pillars by the kinetic energy of the ocean, wherein either of the plurality of floats and respective upstanding pillar has the one or more permanent magnets while other one of the plurality of floats or upstanding pillars has the conductive coil, wherein the movement of the dock relative to the plurality of upstanding pillars results in generation of electricity.

2. The system according to claim 1, wherein the each of the pillar of the plurality of upstanding pillars has the one or more permanent magnets and each float of the plurality of floats has the conductive coil.

3. The system according to claim 1, wherein the each of the pillar of the plurality of upstanding pillars has the conductive coil and each float of the plurality of floats has the one or more permanent magnets.

4. The system according to claim 1, wherein the kinetic energy of the ocean is the energy of waves.

5. The system according to claim 1, wherein the plurality of floats comprises four floats and the plurality of upstanding pillars comprises four pillars, the four floats are configured at four corners of the dock.

6. The system according to claim 2, wherein the one or more permanent magnets are radially arranged in rows on an outer surface of the each of the upstanding pillars and the conductive coil wound within the each of the plurality floats around corresponding one of the central apertures.

7. The system according to claim 3, wherein the one or more permanent magnets are radially arranged within each of the plurality of floats around corresponding one of the central apertures and the conductive coil wound around the each of the upstanding pillar up to a pre-determined length.

8. The system according to claim 1, wherein the each of the pillar of the plurality of upstanding pillars is cylindrical and the central aperture of the each of the plurality of the floats is round, a diameter of the central aperture of the each of the plurality of the floats is larger than a diameter of the each of the upstanding pillars so that the float freely moves relative to the respective pillar.

9. A method for harnessing kinetic energy of ocean to generate electricity, the method comprises:
providing a system comprising:
a dock made from a buoyant material, the dock has a plurality of floats, each of the of the plurality of floats has a central aperture, the each of the the plurality of floats comprises one or more permanent magnets or a conductive coil; and a plurality of upstanding pillars, wherein each of the pillar of the plurality of upstanding pillars comprises one or more permanent magnets or a conductive coil, wherein the each of the plurality of floats receives one of the pillars of the plurality of upstanding pillars, the method further comprises;

moving the dock up and down relative to the plurality of the upstanding pillars by kinetic energy of the ocean, wherein either of the plurality of floats and respective upstanding pillar has the one or more permanent magnets while other one of the plurality of floats or upstanding pillars has the conductive coil, and generating electricity by the up and down moving of the dock relative to the plurality of upstanding pillars.

10. The method according to claim 9, wherein the each of the plurality of upstanding pillars has the one or more permanent magnets and the each of the plurality of floats has the conductive coil.

11. The method according to claim 9, wherein the each of the plurality of upstanding pillars has the conductive coil and each of the plurality of floats has the one or more permanent magnets.

12. The method according to claim 9, wherein the kinetic energy of the ocean is the energy of waves.

13. The method according to claim 9, wherein the plurality of floats comprises four floats and the plurality of upstanding pillars comprises four pillars, the four floats are configured at four corners of the dock.

14. The method according to claim 10, wherein the one or more permanent magnets are radially arranged in rows on an outer surface of the each of the upstanding pillars and the conductive coil wound within the each of the plurality floats around corresponding one of the central apertures.

15. The method according to claim 11, wherein the one or more permanent magnets are radially arranged within each of the plurality of floats around corresponding one of the central apertures and the conductive coil wound around the each of the upstanding pillar up to a pre-determined length.

16. The method according to claim 9, wherein the each of the pillar of the plurality of upstanding pillars is cylindrical and the central aperture of the each of the plurality of the floats is round, a diameter of the central aperture of the each of the plurality of the floats is larger than a diameter of the each of the upstanding pillars so that the float freely moves relative to the respective pillar.

* * * * *